March 4, 1958 — E. UHER — 2,825,417
DRIVING UNIT FOR MOTORCYCLE WHEEL
Filed March 13, 1956 — 3 Sheets-Sheet 1

Inventor:
Edmond Uher
BY
Richard Geier
ATTORNEYS

March 4, 1958  E. UHER  2,825,417
DRIVING UNIT FOR MOTORCYCLE WHEEL
Filed March 13, 1956  3 Sheets-Sheet 2
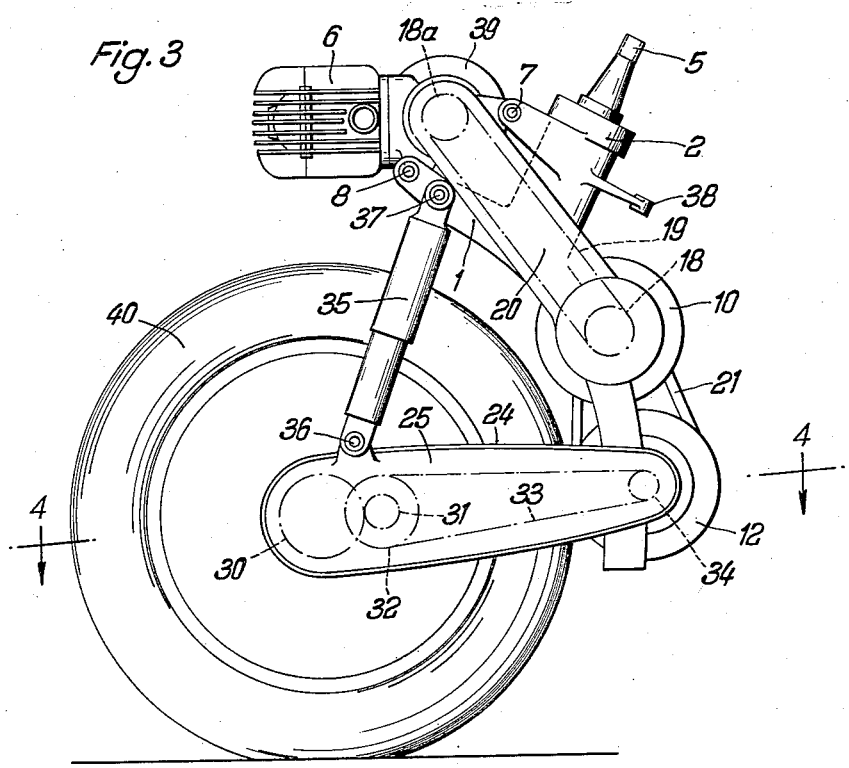
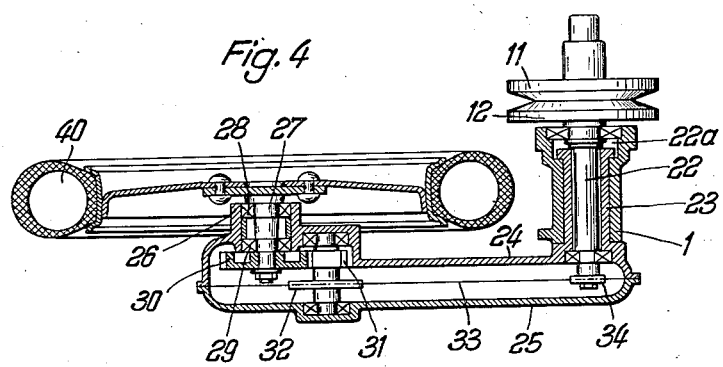
Inventor:
Edmond Uher
BY
Richard y Geier
ATTORNEYS March 4, 1958  E. UHER  2,825,417
DRIVING UNIT FOR MOTORCYCLE WHEEL Filed March 13, 1956  3 Sheets-Sheet 3

*Inventor:*
Edmond Uher
by
ATTORNEYS

United States Patent Office 2,825,417
Patented Mar. 4, 1958

2,825,417

DRIVING UNIT FOR MOTORCYCLE WHEEL

Edmond Uher, Chemins des Mougins, France

Application March 13, 1956, Serial No. 571,337

2 Claims. (Cl. 180—31)

This invention relates to a motor drive and refers, more particularly, to a complete driving unit intended for driving a wheel of a motorcycle and the like, and consisting of the motor, the gear connection, the wheel, a swinging arm, a shock absorber and all the means necessary for the transmission of movements from the motor shaft to the wheel axle.

Prior art drives for motorcycles included an endless belt which was guided over two guiding rollers and was used to actuate the wheel. In another prior art construction the fork-shaped frame element carrying the driving wheel was also used to support the gasoline container. Finally, constructions are known wherein the motor and the drive are carried by a platform attached to the fork-shaped frame member.

An object of the present invention is to improve all these and other prior art constructions through the provision of a drive unit which is particularly suitable for small motorcycles of the inexpensive type having only one motor-driven wheel.

Another object is the provision of a motor drive of the described type which consists of a unit that may be attached to the vehicle at one single point or at one single location in such manner that it can be easily attached and taken off when required.

Yet another object of the present invention is the provision of a motor unit which can be easily attached to a vehicle and which includes a driving motor of the internal combustion engine type, a gear drive, a wheel, a swinging arm serving as a support for the wheel, a shock absorber, as well as means for transmitting movements from the motor shaft to the wheel axle.

Still another object of the present invention is the provision of a wheel driving aggregate which is particularly suitable for use along with a stepless cone belt drive.

Other objects of the present invention will become apparent in the course of the following specification.

In accomplishing the objects of the present invention it was found advisable to provide a support serving as a carrier for the motor and the drive, including the means transmitting power and movements. The carrier follows approximately the outer circumference of the wheel of the vehicle and is mounted in the form of a bent body above the wheel. The carrier is connected on the one hand with a swinging arm and, on the other hand, with a shock absorber. The driving wheels as well as the rotary axle of the oscillating and spring supported swinging arm, and also preferably the motor shaft or the crankshaft are located on or in the carrier parallel to the wheel axis. This common carrier is provided with a holding member or connecting member, preferably located between the motor and the drive, by means of which the entire driving aggregate may be attached, removably if desired, to a vehicle, or a supplementary part of a vehicle, or to the frame of the vehicle or the like.

According to one of the embodiments of the present invention, the driven shaft, as well as the pivot of the swinging arm, are located within the interior of the support which may be U-shaped. This construction is carried out preferably in such manner that the driven shaft of the drive extends coaxially in the inner chamber of the support which receives the lug serving as the pivot for the link. The driving shaft is located within the arm pivot and carries the driving means, such as a gear wheel for a roller chain, for the wheel drive which may be direct or through a reduction gear. The wheel drive is preferably located within a separate casing which constitutes the swinging arm.

According to a preferred embodiment of the inventive idea the driving aggregate for the wheel can be provided in a most simple and effective manner with a stepless cone-belt drive in such manner that the motor, the connecting member provided upon the carrier and used for attachment to the wheel, the pair of driving belt pulleys, and the pair of driven belt pulleys, along with the transmission members belonging thereto, are provided in the order named along the common support and are arranged fanwise in relation to the axis of the wheel. The shaft of the pair of the driven pulleys is advantageously mounted within the rotary axle of the swinging arm.

According to a further embodiment of the inventive idea, it is possible to use an ordinary step transmission such as a gear drive. The motor, the holding or attaching member for connection to the vehicle, as well as the stepwise drive, such as the gear drive, may be provided along the common carrier and may be arranged fanwise in relation to the axle of the wheel.

According to a specific embodiment of the present invention the driving wheels, such as the gears, the counter shafts, as well as the driven shaft, may be arranged one behind the other along the common support and at least the driven shaft or, preferably, additional or all shafts may be arranged parallel to the wheel axis.

For steering purposes the one-wheel driving aggregate of the present invention can be rotatably or swingably mounted upon the frame of the vehicle.

The invention will appear more clearly from the following detailed description when taken in connection with the accompanying drawings, showing, by way of example, preferred embodiments of the inventive idea.

In the drawings:

Figures 1 to 4 show a stepless cone-belt drive, whereby

Figure 1 is a section through a carrier constructed in accordance with the present invention and illustrates the combustion motor, the rotatably mounted holding bolt and the two pairs of belt pulleys of the cone-belt drive, along with their axles but without the swinging wheel supporting arms.

Figure 2 is a top view of the device shown in Figure 1, some parts being shown in section.

Figure 3 is a side view of the driving aggregate of Figures 1 and 2 and also shows the vehicle wheel, the wheel suspension and the shock absorber.

Figure 4 is a section along the line 4—4 of Figure 3.

Figure 5 is a section through a support constructed in accordance with the present invention, and also illustrates the motor, the rotatably supported connecting bolt, and the step drive along with the axles, pertaining thereto, but without the wheel suspension.

Figure 6 is a top view of the construction illustrated in Figure 5, some parts being shown in section.

Figure 1:
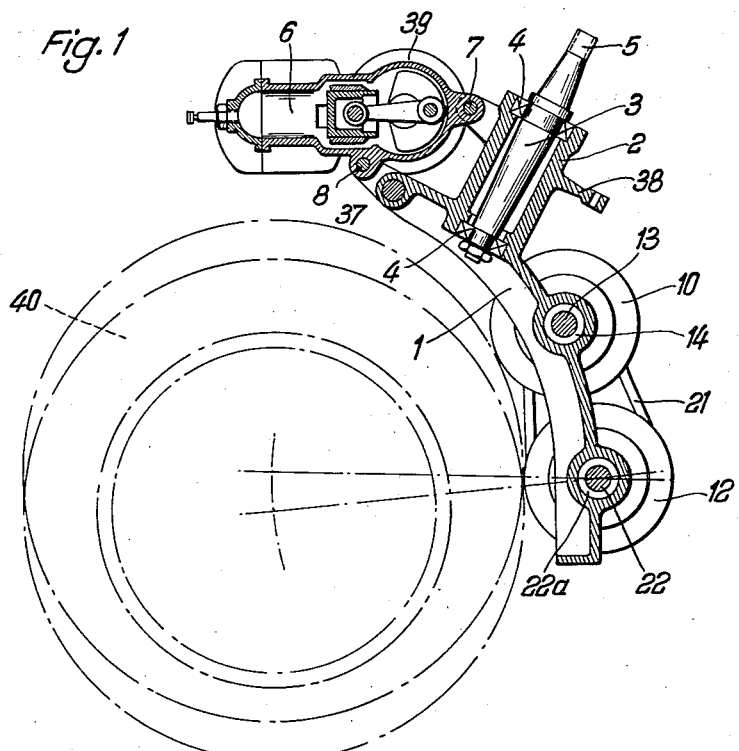
Figure 2:
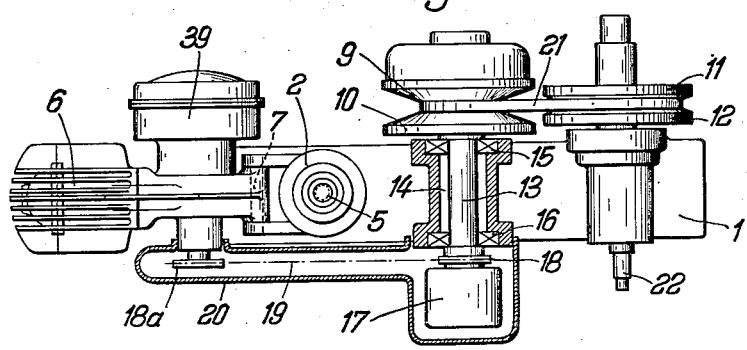

The construction shown in Figures 1 to 4 includes a U-shaped support 1 which is curved longitudinally, corresponding to the circumference of a wheel 40 of the vehicle. The carrier 1 is integral with a sleeve or holder 2, provided with an extension 38. The sleeve 2 contains a connecting bolt 3 which is mounted in the sleeve 2 by means of radial bearings 4. The bolt 3 has a conical portion which projects out of the sleeve 2 and which terminates in a threaded portion 5. This conical end and the threaded portion 5 serve for attaching the device to the frame of a vehicle or to a supplementary member, constituting a part of the vehicle or the like.

The bolt 3 extends at an acute angle to the vertical plane and intersects the vertical symmetry axis of the wheel below the center of the wheel, to provide the dash which facilitates steering.

The motor 6, which is of the internal combustion type, has a longitudinal axis which extends horizontally. The axis of the crankshaft of the motor extends parallel to the vehicle wheel 40. The motor 6 is connected to the front end portion of the carrier 1 by means of two threaded bolts 7 and 8. The bolt 7 may be constructed somewhat eccentrically so as to regulate the tension of the driving chain. Due to this arrangement the motor can be moved to a small extent about the other threaded bolt 8.

The cone-belt drive of the device is without steps and is automatic; it consists of two pairs of cone-belt pulleys 9 and 10, and 11 and 12. Each of these pairs can be shifted axially in relation to each other and is loaded in the direction toward each other by springs, swinging weights and the like. This construction is known in the art and is not further illustrated.

The pulley 10 is carried by an axle 13 which extends parallel to the axis of the motor crankshaft and is located within a chamber 14 provided within the carrier 1. The axle 13 is supported in ball bearings 15 and 16. The other end of the axle 13 carries a coupling 17. The casing of the coupling 17 carries a chain wheel 18. The wheel 18 is driven by means of a chain wheel 18a which is attached to a crankshaft of the motor and which is also connected with a wheel 18 by means of an endless roller chain 19. A casing 20 encloses the coupling 17 and serves for the protection of the chain 19.

The driven pair of pulleys 11 and 12 is actuated by a cone belt 21. The axle 22 carrying the pulleys 11 and 12 is mounted in a hollow chamber 22a of the carrier 1. As shown in Figure 4, the chamber 22a in addition to the axle 22 carries the supporting pivot 23, which is hollow and which serves as the pivot for the swinging arm 24. The arm 24 is also hollow and is provided with a cover 25. The opposite end of the arm 24 serves as a bearing sleeve 26 for the axle 27 of the wheel 40. The sleeve 26 carries the two ball bearings 28 and 29 which support the axle 27. A pair of gears 30 and 31 is used to provide the necessary transmission ratio.

A gear 32 for the endless chain 33 is keyed upon the same shaft which carries the pinion 31. Thus, the chain gear wheel 34 is used to drive the gear 32 by means of the endless chain 33. A spring supported shock absorber 35 (Fig. 3) is used for resiliently suspending the wheel 40. The shock absorber 35 is connected by means of a joint 36 with a swinging arm 24 and is also connected by means of a joint 37 with the carrier 1.

It is apparent that the wheel drive of the present invention can be also used effectively as a drive for the front wheel serving as a steering wheel. In that case the bolt 3 shown in Figure 1 is rotatably mounted in the carrier. The drive can be steered then by means of a lever 38.

On the other hand, if the drive is connected to the rear wheel which cannot be steered, then the bolt 3 will be firmly mounted in the sleeve 2 and will be firmly attached to the frame of the casing.

The internal combustion engine of the present invention can include a starter dynamo 39 shown in Figure 1, and provided with means for reversing its direction of rotation (not shown). When a two-stroke engine is used, its direction of rotation can be reversed to provide rearward movement by changing the polarity of the starter, so that a gear-shift for this purpose becomes unnecessary.

Through the provision of a single point attachment by means of the bolt 3, in accordance with the present invention, the wheel drive of the present invention can be easily and quickly attached to the motor frame and removed therefrom. The fanwise or radial arrangement of the driving elements and the horizontal mounting of the motor require the least possible space for the drive as a whole. The center of gravity of the drive lies sufficiently low. Furthermore, the swingable drive can be well balanced through the arrangement of the dynamo starter and the two belt pulleys upon one side of the carrier, while the wheel suspension will be located upon the other side. Such static balancing of weight is quite important to provide easy steering.

It is apparent that the motor 6 and the drive, such as the cone-belt pulleys 9 to 12, are located within the space defined by the upper quarter of the circumference of the wheel located between vertical and horizontal planes extending through the axis of the wheel. Thus, the axis of the last pair of cone-belt pulleys 11 and 12 extends in the horizontal plane through the center of the motor vehicle, which provides a particularly stable arrangement. The motor 6 can be attached by means of bolts 7 and 8 to projections provided upon the carrier 1 upon that side thereof which is opposite the arm 24.

Figure 5:
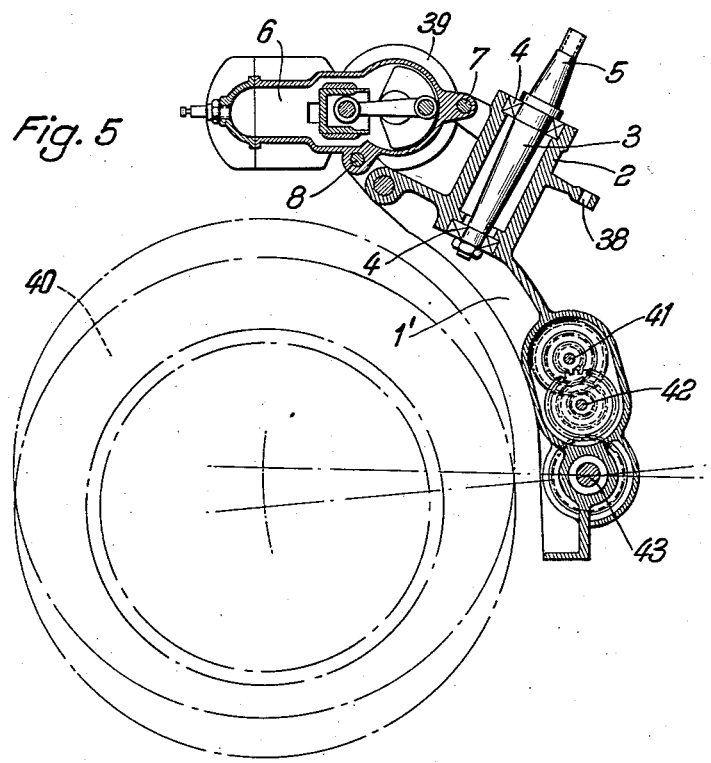
Figures 5 and 6 show a three-step drive, whereby
Figure 6:
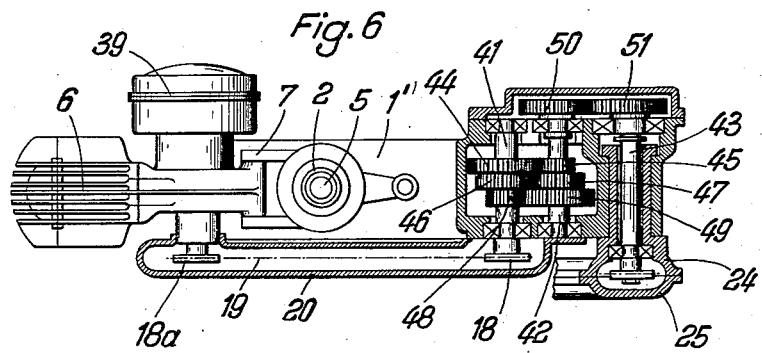

Figures 5 and 6 illustrate a somewhat different construction, wherein the support or carrier 1' is also U-shaped in cross-section and is bent in conformity with the circumference of the wheel 40. The carrier 1' has a sleeve 2 which carries a bolt 3 supported in radial bearings 4. The bolt 3 has a conical extension 5 and a threaded portion by means of which the support 1' can be attached to the frame or a supplementary frame element of a vehicle.

The combustion motor 6 has a longitudinal axis which extends horizontally and has a crankshaft, the axis of which extends parallel to the wheel 40. The motor 6 is attached to the carrier 1' by means of bolts 7 and 8. In order to regulate chain tension, the bolt 7 may be somewhat eccentric so that the motor 6 may be swung to some extent about the other bolt 8.

The multi-step drive of this construction has two transmission shafts 41 and 42. A third shaft 43, which is a driven shaft, extends coaxially upon the swinging arm 24 of the rear wheel. The shafts 41 and 42 carry corresponding gear wheels 44—45, 46—47, and 48—49, or the like, which correspond to the three speeds capable of being set by the illustrated drive. The various speeds can be set by means of the known wedge-gear, or by any other suitable means which are known in the art and which are not illustrated in the drawings. The shaft 41 is driven by a chain gear wheel 18a which is keyed upon the motor crankshaft, the drive taking place by means of endless roller chain 19. The second shaft 42 drives a third shaft 43 by means of the gears 50 and 51. A casing 20 serves to protect the chain 19. The swinging arm 24 of the rear wheel suspension forms along with its cover 25 a hollow casing and at its other end serves as a bearing support for the wheel axle in a manner similar to that of Figure 4 and not illustrated in the drawings.

In other respects the construction is substantially similar to that previously described.

In the illustrated examples the motor extends horizontally, while the motor shaft extends parallel to the axle of the wheel. Due to this arrangement, in accordance with the present invention, it is possible to mount all the driving elements including the motor and the two axles of the belt transmission pulleys which can be part of a cone-belt drive, as well as the axis of rotation of the wheel support, parallel with respect to their axes to the wheel axle upon a single carrier adapted to the circumference of the wheel and rotatably or immovably mounted upon the vehicle frame or the like.

However, in accordance with the present invention, this arrangement is possible even when the motor is carried in a different position upon the support, for example, when the motor while extending horizontally has a motor shaft which extends transversely to the wheel axle and is connected by a worm drive or the like with the first driven shaft. It is also possible to replace the chain drive between the motor shaft and the first driven shaft, or between the driven shaft of the drive and the wheel, by other transmission means known in the art.

As is apparent from the illustrated constructions, the provision or use of the very effective stepless cone-belt drive is effectively possible within the confines of the present invention.

As already stated, the drive of the examples illustrated can be also used for the front steering wheel of the vehicle, in which case the bolt 3 or 3' must be rotatably mounted and the drive can be actuated by means of a lever 38 or 38'. On the other hand, if the wheel is not to be turned, the bolt 3 or 3' is firmly mounted in the sleeve 2 or 2' and is thus attached to the wheel frame. Furthermore, as already stated, the starter dynamos 39 and 39' of the present invention can have reversed polarity, so that they can be effectively used for rotating the wheel in the opposite direction, without the necessity of using a special gearshift for that purpose.

The fact that the drive is mounted on one place only makes the dismounting particularly effective, so that a single drive can be used for frames of different construction. The entire device consumes the least possible amount of space and is effectively balanced.

Obviously, the illustrated stepwise drive can be replaced by a different drive and the transmission can be made by pinions or any other suitable means. Furthermore, the driven member can be arranged in a separate casing. All such and other variations and modifications are to be included within the scope of the present invention.

What is claimed is:

1. A motor drive aggregate for the wheel of a vehicle, comprising an elongated support located over a portion of said vehicle and having a front end and a rear end and a curvature corresponding substantially to that of said wheel, a connecting bolt, a bearing carried by said support intermediate the ends thereof and carrying said bolt, a sleeve carried by said support and enclosing said bolt, said bolt having an end portion projecting beyond said sleeve for the attachment of said support to the vehicle, a motor carried by said support, a motor drive carried by said support and operatively connected with said motor, and means carried by said support and connected with said motor drive and said wheel for driving said wheel; said motor, said bolt, said motor drive and said means being located fanwise upon said curved support, the masses of the parts carried by said support between the front end thereof and said bearing being substantially equal to the masses of the parts carried by said support between the rear end thereof and said bearing.

2. A motor drive aggregate for the wheel of a vehicle, comprising an elongated support located over a portion of said vehicle and having a front end and a rear end and a curvature corresponding substantially to that of said wheel, a connecting bolt, a bearing carried by said support intermediate the ends thereof and carrying said bolt, a sleeve carried by said support and enclosing said bolt, said bolt having an end portion projecting beyond said sleeve for the attachment of said support to the vehicle, a motor carried by said support between the front end thereof and said bearing, a motor drive carried by said support between the rear end thereof and said bearing and operatively connected with said motor, a hollow oscillatory arm connected with said motor drive and said wheel, means located within said hollow arm and operatively connecting said motor drive with said wheel for driving said wheel, and a shock absorber connected with said wheel and connected with said support between the front end thereof and said bearing, said arm and said shock absorber being of such length that the center of said wheel is located in front of said bearing.

References Cited in the file of this patent
UNITED STATES PATENTS

| | | |
|---|---|---|
| 1,506,270 | Pullin | Aug. 26, 1924 |
| 2,420,100 | Salsbury | May 6, 1947 |

FOREIGN PATENTS

| | | |
|---|---|---|
| 226,564 | Germany | July 18, 1909 |
| 315,915 | Germany | Nov. 15, 1919 |